(12) United States Patent
Chang

(10) Patent No.: US 6,420,446 B1
(45) Date of Patent: Jul. 16, 2002

(54) POLYURETHANE PREPARED FROM SORBITOL-BRANCHED POLYESTERS

(75) Inventor: Wally Liyuan Chang, White Plains, NY (US)

(73) Assignee: CK Witco, Greenwich, CT (US)

( * ) Notice: Subject to any disclaimer, the term of this patent is extended or adjusted under 35 U.S.C. 154(b) by 0 days.

(21) Appl. No.: 09/535,217

(22) Filed: Mar. 27, 2000

(51) Int. Cl.⁷ .................. C08G 18/42; C08G 18/48; C08J 9/04
(52) U.S. Cl. .................. 521/172; 521/163; 521/166; 521/167; 521/173; 521/174; 521/175; 521/176; 528/73; 528/76; 528/77; 528/78; 528/80; 528/81; 528/83

(58) Field of Search .................. 521/163, 166, 521/167, 172, 173, 174, 175, 176; 528/73, 76, 77, 78, 80, 81, 83

(56) References Cited

U.S. PATENT DOCUMENTS 3,079,350 A * 2/1963 Berstein .................. 528/81

* cited by examiner

*Primary Examiner*—Rabon Sergent
(74) *Attorney, Agent, or Firm*—Scully, Scott, Murphy & Presser

(57) ABSTRACT

Polyurethanes synthesized from sorbitol-branched polyester made by esterification of a diacid (or anhydride thereof diol, and sorbitol (or mixtures of same with other polyols).

35 Claims, No Drawings

POLYURETHANE PREPARED FROM SORBITOL-BRANCHED POLYESTERS

FIELD OF THE INVENTION

The present invention relates to a novel polyurethane composition and a method of preparing same.

BACKGROUND OF THE INVENTION

Polyurethanes are used in many familiar products, such as elastomers, solid articles, films, and in the manufacturing of foams. The various uses require the polyurethanes to exhibit certain properties such as low temperature flexibility, high tensile strength, high tear strength, high elongation, abrasion resistance, solvent resistance and the like, to ensure that the articles made therefrom can withstand the environments in which they are used. The continuing and, indeed, growing attractiveness of using polyurethanes in various products and uses has prompted the continuing effort to identify polyurethanes exhibiting these properties to a greater degree, and exhibiting optimal combinations of these properties than currently available polyurethanes.

The present invention is directed to such polyurethanes. These are useful in the manufacture of foams, elastomers, solid articles such as shoe soles, and other uses to which polyurethanes are put.

Conventionally, polyurethanes are obtained by reacting a polyester polyol with a diisocyanate whereby the hydroxyl groups on the polyester polyol are endcapped with isocyanate groups, thereby forming a prepolymer. The prepolymer is chain extended by contacting it with a suitable di- or higher-functional chain extender bearing functional groups reactive with the terminal isocyanate groups on the prepolymer.

While some branched polyester polyols have found use in the manufacture of polyurethane, wherein the polyester is derived from a trifunctional or tetrafunctional polyol (such as, respectively, glycerin or pentaerythritol,) the present invention has unexpectedly discovered that polyesters derived from sorbitol provides superior properties compared to conventional polyurethanes.

BRIEF SUMMARY OF THE INVENTION

The polyurethane of the present invention is prepared from a sorbitol-branched polyester. In a particular practice of the invention, sorbitol (or mixtures of sorbitol with other suitable polyols as hereinafter described) is synthetically incorporated into the backbone of a polyester. The sorbitol-branched polyester that results car be employed to fabricate polyurethanes by e.g., reaction with an isocyanacte with chain extension. The polyurethane that eventuates exhibits physical properties superior to those heretofore known, including improved low temperature flexibility, tensile strength, tear strength, modulus strength, elongation %, abrasion resistance, rebound %, solvent resistance etc.

DETAILED DESCRIPTION OF THE INVENTION

The polyurethane of the invention is fabricated using a sorbitol-branched polyester. Without limitation, the sorbitol-branched polyester is formed by reacting sorbitol (or a mixture of sorbitol and other polyols as defined hereinbelow) and a diol with a diacid (or arhydride thereof).

As used herein:

Polyols: polyols useful in the present invention include those containing 2 or more (e.g. 5 to 12) hydroxyl groups and up to 50 carbon atoms. They may be in the D,L, or mixed D,L form. Alkoxylates of such polyols are also within the ambit of the present invention inasmuch as they are hydroxyl terminated. They can be alkoxylated with up to 30 moles (per mole of polyol) of alkylene oxide such as ethylene oxide, propylene oxide, butylene oxide etc. and mixtures thereof. Examples of polyols in this regard include: glcuose, dipentaerythritol, sucrose, tripentaerythritol, allitol, cyclodextrin (cycloheptaamylose), dulcitol (galactiol), glucitol, mannitol, altritol, iditol, ribitol, arabinitol, xylitol, maltitbl, lactitol, trimethylolpropane, glycerin, trimethylolethane, tris-(2-hydroxyethyl) isocyanurate, tris-(2-hydroxypropyl) isocyanurate, tris-(3-hydroxpropyl) isocyanurate triisopropanolamine, and pentaerythritol.

Diols: diols useful in the invention include those containing 2 to 12 carbon atoms. In cases where glycol ethers are utilized in the diol component, it is preferred that they contain from 4 to 12 carbon atoms. Examples of diols include: ethylene glycol, diethylene glycol (which is a preferred diol), 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

Diacids: diacids useful in the present invention include: aliphatic dicarboxylic acids, alicyclic dicarboxylic acids, aromatic dicarboxylic acids, ethylenically unsaturated alkenyl dicarboxylic acids, or mixtures of two or more of these acids. Preferred are alkyl dicarboxylic diacids which generally will contain 2 to 12 carbon atoms, and aromatic dicarboxylic diacids which generally contain 6 to 12 carbon atoms. Examples of useful diacids include: oxalic, malonic, dimethylmalonic, succinic, glutaric, adipic, trimethyladipic, pimelic, pivalic, dodecanedioc, 2,2-dimethylglutaric, azelaic, sebacic, maleic, fumaric, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,6-norbornanedicarboxylic, 1,4-naphthalic, diphenic, 4,4'-oxydibenzoic, diglycolic, thiodipropionic, 4,4-sulfonyldibenzoic, and 2,5-naphthalenedicarboxylic acids. Anhydrides of any of the foregoing diacids are also employable.

Preferred diacids include: isophthalic acid, terephthalic acid, phthalic acid, adipic acid, tetrahydrophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

Formation of the Sorbitol-Branched Polyester:

In the present invention, the total amount sorbitol (or mixtures of sorbitol with other polyols) and diol is sufficient to provide an excess of hydroxyl groups with respect to diacid carboxylic groups (similar considerations apply to the use of anhydrides of said diacids). It will be recognized that to ensure that the sorbitol-branched polyester is capped with terminal hydroxyl groups, it may be necessary to provide in the reaction mixture more than simply a slight stoichiometric excess of the indicated component; the degree of excess is tempered, however, by the effect of excess on the distribution of polymeric chain lengths formed in the condensation polymerization.

Sorbitol is present in the reaction mixture in an amount sufficient to provide a residue in the resultant polyester constituting about 0.1 wt. % to about 15 wt. % of said polyester. In a preferred practice, this percentage is at least about 0.5 wt. %, more preferably at least about 1 wt %, including e.g., about 5% to about 15 wt %.

The reaction mixture containing the sorbitol, diol and diacid (or anhydride) is subjected to condensation polymerization conditions effective to cause the reactants to react with each other to form the sorbitol-branched polyester. In general, effective condensation polymerization conditions are familiar to (or otherwise readily ascertainable by) the practitioner. It is preferred not to carry out the reaction in a solution. However, if a solvent is desired, it should be high boiling (i.e. a boiling point above about 140° C.) Examples of suitable solvents include: DMF (dimethylformamide), DMA (N,N-dimethylacetamide), xylene and DMSO. Combinations of solvents may also be employed.

Preferably, the reaction mixture for carrying out the condensation polymerization includes a small but effective amount (such as up to about 0.02 wt. %) of a catalyst for the polymerization. Useful catalytic compounds include: protonic acids, tin compounds, titanium compounds and antimony compounds.

Typical condensation polymerization conditions are provided by exposing the reactants to temperatures on the order of about 150° C. to about 250° C. As the reaction progresses, it is preferred to draw off water of condensation. A preferred method is to use nitrogen to purge the reaction mixture in order to remove the water.

The chain length (molecular weight) of the sorbitol-branched polyester produced can fall within a rather wide range; typically, a sorbitol-branched polyester will have a molecular weight in the range of about 200 to about 50,000. Amounts and identities of the reactants can be readily tailored to achieve desired molecular weight and distribution.

At the end of the condensation polymerization, the sorbitol-branched polyester can be recovered and separated from the reaction mixture.

Formation of the Polyurethane:

The sorbitol-branched polyester is reacted with one or more polyisocyanates, preferably one or more diisocyanates, optionally with one or more chain extenders, to produce the subject polyurethane.

Any organic polyisocyanate may be used in the process according to the invention. It is preferred to use polyisocyanates of the formula $Q(NCO)_2$ wherein Q represents an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms or an araliphatic hydrocarbon group containing from 7 to 15 carbon atoms. The most preferred diisocyanate is isophorone diisocyanate. Other preferred diisocyanates include: tetramethylene-diisocyanate, hexainethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanatodicyclohexylmethane, 4,4'-diisocyanatodicyclohexyl-propane-(2,2); 1,4-diisocyanato-benzene, toluene diisocyanates such as 2,4-diisocyanatotoluene and 2,6-diisocyanatotoluene; 4,4'-diphenylmethane diisocyanate, 4,4'-diisocyanatodiphenyl-propane-(2,2), p-xylylene-diisocyanate, a,a,a',a'-tetramethyl-m or p-xylylene-diisocyanate and mixtures of these compounds. Mixtures of any of the foregoing can also be used. The mole ratio of polyisocyanate to sorbitol-branched polyester is generally stoichiometric, e.g. about 1:1 to about 30:1.

The reaction of the sorbitol-branched about polyester with the polyisocyanate can optionally be carried out in the presence of comonomer such as a lower diol containing 2 to 12 carbon-atoms or water. Typical amounts of such a comonomer are up to about 10 wt. % of the amount of all reactants present.

Reaction of the polyisocyanate and the sorbitol-branched polyester can be carried out at moderately elevated temperatures, e.g. about 50° C. to about 150° C. The reaction can be carried out with or without a solvent (inert). One preferred solvent is N-methyl pyrrolidone. Other suitable solvents include acetone, methyl ethyl ketone, toluene, dimethyl formamide, ethyl acetate, tetrahydrofuran, and dioxane.

As before stated, the reaction of the sorbitol-branched polyester and polyisocyanate may optionally include a suitable chain extender.

Satisfactory chain extenders include: water, diamines such as hydrazine, and alkyl and aromatic polyols, especially diols, and alkyl and aromatic diamines and triamines, wherein the alkyl moiety contains a total of 2 to 12 carbon atoms or the-aromatic moiety contains 6 to 10 carbon atoms. Other examples of chain extenders include: ethylene diamine, diethylene triamine, 1,2-diaminopropane, 1,3-diaminopropane, 1,4-diaminobutane, and 3,3,5-trimethyl-5-aminomethyl cyclohexylamine; and ethylene glycol, 1,2-dihydroxypropane, 1,6-dihydroxyhexane, and the polyols described herein as useful reactants to make the polyester.

In place of water (and combinations containing water) as a chain extender, a conventional foaming agent may optionally be used in forming the polyurethane product. A highly preferred foaming agent is carbon dioxide. Other foaming agents that may optionally be employed in the present invention include: methylene dichloride, CFC, and the like.

The following are offered as illustrative examples of the present invention; they are not to be construed a limitation.

EXAMPLES

PROCEDURES

A. Polyester Functionality

The functionality of hydroxyl-terminated polyester was calculated using the following equation which was derived and published by W. L. Chang, *Journal of Applied Polymer Science*, Vol. 51, 1077 (1994):

Equation for Polyester Functionality $$f = \frac{2}{1-(n-2) \times EW/Y}$$

where f=the functionality of the hydroxyl-terminated polyester n=the functionality of the sorbitol (and mixture thereof. with other polyols)

EW=the equivalent weight of the polyester ($56,100/OH^\#$)

$OH^\#$=the hydroxyl number

Y=the yield based on 1 mole of the sorbitol (and mixture thereof with other polyols)

The functionality of blend polyesters can be calculated as follows:

$$OH_m^\# = \frac{W_i \times OH_i^\#}{\sum W_i}$$

where $OH_m^\#$=The hydroxyl number of mixed chain extenders
$OH_i^\#$=The hydroxyl number of individual claim extenders
$W_i$=The weight of individual claim extenders B. Solvent Uptake % Test Solvent uptake data were obtained using the following procedure:
1. Cut one piece of elastomer using a rectangular die (four inches x one half inch).
2. Using scissors, cut the piece in halves of equal size.
3. Make a small hole in each piece, near the top center. Record the weight of each piece using an analytical balance.
4. Thread the pieces through a stainless steel wire and place them into a wide mouth glass quart jar. The wire must be shaped so as to permit the pieces to hang inside the jar. Pieces should not touch each other or the bottom and side of the jar. Maximum eight (8) pieces to a wire.
5. Fill the jar with solvent. Seal with a cap and leave at room temperature, for seven (7) days.
6. Repeat the above procedure using different solvent. Solvents must not be reused.
7. After the desired time period has elapsed (7 days), remove pieces from wire, quickly wipe them with paper towel, and immediately record weight.
8. Report results as % weight gain.

uptake %=$(W_f-W_0)/W_0 \times 100\%$ where $W_f$=final weight and $W_0$=initial weight.

ELASTICITY RECOVERY %

Elasticity recovery data were obtained using the following procedure:
1. Cut four (4) pieces of elastomer using tensile die.
2. Use instron as tensile strength measurement. Mark the original length as $L_o$ is one inch.
3. Hold exactly 10 minutes at elongation 300%.
4. Release the sample right away, let the sample sit on bench exactly 1 minute. Measure the length L.

elasticity recovery %=$[1-(L-L_o)/x.L_o] \times 100\%$ where L=the length (inch) after stretch
X=elongation %

ABBREVIATIONS

The following are used throughout this specification.
TMP: trimethylolpropane
Gly: glycerin
ST: sorbitol
EtOAc: Ethyl acetate
EtOH: Ethanol
PE: pentaerythritol
DPE: dipentaerythritol
TPE: tripentaerythritol
MDI: 4,4' diphenylmethane diisocyanate
PU: polyurethane
IPA: Isopropyl alcohol
MEK: Methyl ethyl ketone
Comparative Polyester A: TMP-branched poly (diethylene adipate) glycol with a hydroxyl group functionally of 3.0 and a hydroxyl number of 56
Comparative Polyester B: Gly-branched poly(diethylene adipate) glycol with a hydroxyl group functionality of 3.0 and a hydroxyl number of 56
Comparative Polyester BB: PE-branched poly (diethylene adipate) glycol; hydroxyl group functionally=3.0; hydroxyl number=56
Inventive Polyester C: ST-branched poly (diethylene adipate) glycol with a hydroxyl group functionality of 3.0 and a hydroxyl number of 56
Inventive Polyester D: ST-branched poly (diethylene adpate gycol hydroxyl group functionality=6.0; hydroxyl number=56.
Inventive Polyester E (blend): 50 wgt % % ST-branched poly (diethylene adipate) glycol (hydroxyl group functionality=6.0; hydroxyl number=56) and 50 wgt % poly (diethylene adipate) glycol (hydroxyl group functionality=2.0; hydroxyl number=56; commercial obtainable as Formez 11–56, Witco). Blend component E had a hydroxyl group functionality of 3.0; hydroxyl number=56.
Comparative Polyester F: DPE-branched poly (diethylene adipate) glycol; hydroxyl group functionality=3.0; hydroxyl number=56.
Comparative Polyester G: TPE-branched poly (diethylene adipate) glycol; hydroxyl group functionality=3.0; hydroxyl number=56.
Comparative Polyurethane A-1: MDI-based elastomer made from Comparative Polyester A, the (TMP-branched) polyester, a hard segment % of 34
Comparative Polyurethane B-1: MDI-based elastomer made from Comparative Polyester B, the (Gly-branched) polyester, with a hard segment % of 34
Comparative Polyurethane A-2: MDI-based elastomer made from Comparative Polyester A, the (TMP-branched) polyester, with a hard segment % of 24.
Comparative Polyurethane B-2: MDI-based elastomer made from Comparative Polyester B, the (Gly-branched) polyester, with a hard segment % of 24.
Comparative Polyurethane BB-1: MDI-based elastome made from Comparative Polyester BB, The (PE-branched) polyester, with a hard segment % of 24.
Inventive Polyurethane C-1: MDI-based elastomer made from Inventive Polyester C, the (ST-branched)polyester, with a hard segment% of 34
Comparative Polyurethane G-1: MDI-based elastomer made from Inventive Polyester G, the (TPE-branched) polyester, with a hard segment % of 34.
Inventive Polyurethane C-2: MDI-based elastomer made from Inventive Polyester C, the (ST-branched) polyester, with a hard segment % of 24.
Inventive Polyurethane E-1: MDI-based elastomer made from Inventive Polyester E (blend), with a hard segment % of 24.
Comparative Polyurethane F-1: MDI-based elastomer made from comparative Polyester F, the (DPE-branched) polyester, with a hard segment % of 24.
Comparative Polyurethane G-2: MDI-based elastomer made from Comparative Polyester G, the (TPE-branched) polyester, with a hard segment % of 24.
Comparative Foam A-2: TDI-based foam made from Comparative Polyester A, the (TMP-branched) polyester, with a hard segment % of 28

Comparative Foam B-2: TDI-based foam made from Comparative Polyester B, the (Gly-branched) polyester, with a hard segment % of Inventive Foam C-2: TDI-based foam made from Comparative Polyester C, the (ST-branched) polyester, with a hard segment % of 28

Comparative Foam G-3: TDI-based from made from Inventive Polyester G, the (TPE-branched) polyester, with a hard segment % of 28.

Comparative Example 1

This example illustrates the use of a non-sorbitol-branched polyester.

Specifically, this example employs the polyol trimethylolpropane in fabricating the polyester.

I. Preparation of Comparative Polyester A [TMP-branched Poly(diethylene Adipate)glycol]

| RAW MATERIAL | AMOUNT | |
|---|---|---|
| DEG (diethylene glycol) | 468.8 | g |
| TMP (trimethylolpropane) | 44.7 | g |
| AA (adipic Acid) | 645.7 | g |
| Total Load | 1,159.2 | g |
| Organotin catalyst | 0.02 | g |
| Water to distill | 159.2 | g |
| Theoretical Yield | 1,000.00 | g |
| Theoretical hydroxyl number | 56.1 | |
| Temperature, C. | 230 | |
| Calculated functionality | 3.0 | |
| Acid number | 0.50 | max. |

A four neck glass flask, equipped with a nitrogen inlet, a stirrer, a column, and a thermometer, was charged with the catalyst, diethylene glycol, TMP, and adipic acid. The temperature was increased to 230° C. +/−2, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II.A) Preparation of Comparative Polyurethane A-1 (MDI-based Elastomer)

| Ingredients | weight, grams |
|---|---|
| Comparative Polyester A* | 1,000.00 |
| MDT (4,4'-Diphenylmethane diisocyanate) | 415.5 |
| 1,4BD (1,4-Butanediol) | 99.6 |
| Isocyanate Index (I.I.) | 105 |
| Hard segment%** | 34 |

*TMP-branched poly(diethylene adipate) glycol, OH#56.1, functionality 3.0, M.W. 3,000
**(MDI+1,4BD)/(MDI+1,4BD+polyester)× 100%

II.B) Preparation of Comparative Polyurethane A-2

| Ingredients | Weight, grams |
|---|---|
| Comparative Polyester A* | 1,000.00 |
| MDI | 267.1 |
| 1, 4 butane diol (1,4 BD) | 48.7 |
| Isocyanate Index (I.I) | 105 |
| Hard segment % ** | 24 |

Comparative Polyester A (as prepared in I, above) was vacuum-dehydrated to a moisture content of less than 0.03% prior to elastomer preparation. Comparative Polyester A at 80° C., MDI at 50° C., and 1,4-butanediol at 25° C. were added into a pint can. The mixture, after one minute stirring, was cast into an ASTM plaque mold preheated to 100° C., cured at 100° C. for 1 hour in the mold, followed by post curing at 100° C. for 24 hours in an oven. Cured Polyurethane A-1 elastomers were conditioned for a minimum of one week at room temperature prior to testing.

III. Preparation of Comparative Foam A-2 (TDI-based Foam)

| TDI Foam | phr | Name | Suppliers |
|---|---|---|---|
| Comparative Polyester A | 100.00 | | Witco |
| Water (deionized) | 3.80 | | |
| Jeffcat NEM | 1.80 | N-Ethylmorpholine | Huntsman |
| Dabco B-16 | 0.10 | Dimethyl n-cetyl (C16) amine | Air Products |
| Niax B350 | 1.00 | Organo-silicone surfactant | Witco |
| TDI 65/35 | 45.43 | Toluene diisocyanate 65/35 | Bayer |
| I.I. | 100 | Isocyanate Index | |
| Total | 152.13 | | |

Free rise foams: The foams were prepared by free rise foaming using a batch mixer. The materials used were kept at room temperature prior to usage. A specific amount of Comparative Polyester A and surfactant were pre-weighed in a paper cup and the mixture stirred for about 30 seconds at 300 rpm. The catalysts) were added to the mixture and homogenized thoroughly, followed by the addition of water. The isocyanate was then added to the mixture and stirring was continued for another 10 seconds. The rate of foam formation was monitored by measuring cream time, rise time, gel time and tack free time.

Comparative Example 2

This example illustrates the use of a non-sorbitol-branched polyester. Specifically, this example employs the polyol glycerin in fabricating the polyester.

I. Preparation of Comparative Polyester B [Gly-branched Poly(diethylene Adipate) glycol]

| RAW MATERIAL | AMOUNT | |
|---|---|---|
| DEG (diethylene glycol) | 475.7 | g |
| Gly (glycerin) | 30.7 | g |

-continued

| RAW MATERIAL | AMOUNT |
|---|---|
| AA (adipic Acid) | 655.2 g |
| Total Load | 1,161.6 g |
| Organotin catalyst | 0.02 g |
| Water to distill | 161.6 g |
| Theoretical Yield | 1,000.00 g |
| Theoretical hydroxyl number | 56.1 |
| Temperature, ° C. | 230 |
| Calculated functionality | 3.0 |
| Acid number | 0.50 max. |

A four neck glass flask, equipped with a nitrogen inlet, a column, and a thermometer, was charged with the catalyst, diethylene glycol, Gly (glycerin), and adipic acid. The temperature was increased to 230° C. +/−2, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II.A) Preparation of Polyurethane B-1 (MDI-based Elastomer)

| Ingredients | weight, grams |
|---|---|
| Comparative Polyester B* | 1,000.00 |
| MDI (4,4'-Diphenyl methane diisocyanate) | 415.5 |
| 1,4BD (1,4-Butanediol) | 99.6 |
| Isocyanate Index (I.I.) | 105 |
| Hard Segment % ** | 34 |

*Gly-branched poly (diethylene adipate) glycol, OH# 56.1, functionality 3.0, M.W. 3,000
**(MDI+1,4BD)/(MDI+1,4BD+polyester) × 100%

II.B) Preparation of Comparative Polyurethane B-2

| Ingredients | weight, grams |
|---|---|
| Comparative Polyester B | 1,000.00 |
| MDI | 267.1 |
| 1,4 BD | 48.7 |
| Isoayanate Index I.I. | 105 |
| Hard Segment % | 24 |

Comparative Polyester B was vacuum-dehydrated to a moisture content of less than 0.3% prior to elastomer preparation. Comparative Polyester B at 80° C., MDI at 50° C., and 1,4-butanediol at 25° C. were added into a pint can. The mixture, after one minute stirring, was cast into an ASTM plaque mold preheated to 100° C., cured at 100° C. for 1 hour in the mold, followed by post curing at 100° C. for 24 hours in an oven. The cured Polyurethane (PU) B-1 elastomers were conditioned for a minimum of one week at room temperature prior to testing.

III. Preparation of Comparative Foam B-2 (TDI-based Foam)

| TDI Foam | phr | Name | Suppliers |
|---|---|---|---|
| Comparative Polyester B | 100.00 | | Witco |
| Water (deionized) | 3.80 | | |
| Jeffcat NEM | 1.80 | N-Ethyl-morpholine | Huntsman |
| Dabco B-16 | 0.10 | Dimethyl n-cetyl (C.-16) amine | Air products |
| Niax B350 | 1.00 | Organo-silicone surfactant | Witco |
| TDI 65/35 | 45.43 | Toluene diisocyanate 65/35 | Bayer |
| I.I. | 100 index | Isocyanate | |
| Total | 152.13 | | |

Free rise foams: The foams were prepared by free rise foaming using a bench mixer. The materials used were kept at room temperature prior to usage. A specified amount of Comparative Polyester B and surfactant were pre-weighed in a paper cup and the mixture stirred for about 30 seconds at 30 rpm. The catalyst(s) were added to the mixture and homogenized throughly, followed by the addition of water. The isocyanate was then added to the mixture and stirring continued for another 10 seconds. The rate of foam formation was monitored by measuring cream time, gel time and tack free time.

Comparative Example 3

This example illustrates the use of a non-sorbitol-branched polyester. Specifically, this example employs the polyol pentaerythriol in fabricating polyester.

I. Preparation of Comparative Polyester Component BB

| RAW MATERIAL: | amount (grams) |
|---|---|
| DEG (diethylene glycol) | 488.6 |
| PE (pentaerythritol) | 22.7 |
| AA (adipic Acid) | 648.7 |
| Total Load | 1,159.9 |
| Organotin catalyst | 0.02 |
| Water to distill | 159.9 |
| Theoretical Yield | 1,000.0 |
| Theoretical hydroxyl number | 56.1 |
| Temperature, C. | 230 |
| calculated functionality | 3.0 |
| Acid number | 0.50max |

A four neck glass flask, equipped with a nitrogen inlet, a stirrer, a column, and a thermometer, was charged with the catalyst, diethylene glycol, PE (pentaerythritol), and adipic acid. The temperature was increased to 230° C. +/−2, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II. Preparation of Polyurethane BB-1

| Ingredients | weight, grams |
| --- | --- |
| Comparative Polyester BB | 1,000.00 |
| MDI (4,4'-Diphenylmethane dissocyanate | 267.1 |
| 1,4BD (1,4-Butanediol) | 48.7 |
| Isocyanate Index | 105 |
| Hard segment %** | 24 |

*(PE-branched poly (diethylene adipate) glycol, OH#56.1, functionality 3.0, M.W. 3,000
**(MDI+1,4BD)/(MDI+1,BD+polyester) × 100%

Comparative Polyester BB was vacuum-dehydrated to a moisture content of less than 0.03% prior to elastomer preparation. Comparative Poyester BB at 80° C., MDI at 50° C., and 1,4-butanediol at 25° were added into a pint can. The mixture after one minute stirring was casted into ASTM plaque mold, preheated to 100° C. for 24 hours in an oven. The cured PU elastomers were conditioned for a minimum of one week at room temperature prior to testing.

Comparative Example 4

This example illustrates the use of a non-sorbitol-branched polyester. Specifically, this example employs the polyol dipentaerthyritol in fabricating the polyster.

I. Preparation of Comparative Polyester F

| RAW MATERIAL: | amount, grams |
| --- | --- |
| DEG (diethylene glycol) | 493.8 |
| DPE (dipentaerythritol) | 21.2 |
| AA (adipic Acid) | 643.7 |
| Total Load | 1,158.7 |
| Organotin catalyst | 0.02 |
| Water to Distill | 15873 |
| Theoretical Yield | 1,000.0 |
| Theoretical hydroxyl number | 56.1 |
| Temperature, C. | 230 |
| Calculated functionality | 3.0 |
| Acid number | 0.50max |

A four neck glass flask, equipped with a nitrogen inlet, a stirrer, a column, and a thermometer, was charged with the catalyst, diethylene glycol, DPE (dipentaerythritol), and adipic acid. The temperature was increased to 230° C. +/−2, while the column was kept hot using steam. The nitrogen and agitation was increased, as the reaction proceeded, to facilitate the water removal, but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II. Preparation of Polyurethane F-1

| Ingredients | weight, grams |
| --- | --- |
| Comparative Polyester F | 1,000.00 |
| MDI (4,4'-Diphenylmethane dissocyanate) | 267.1 |
| 1,4BD (1,4-Butanediol) | 48.7 |
| Isocyanate Index (I.I.) | 105 |
| Hard segment %** | 24 |

*DPE-branched poly (diethylene adipate) glycol, OH#56.1, functionality 3.0, M.W. 3,000
**(MDI+1,4BD)/(MDI+1,4BD+polyester) × 100%

Comparative Polyester F was vacuum-dehydrated to a moisture content of less than 0.03% prior to elastomer preparation. Comparative Polyester F at 80° C., MDI at 50° C., and 1,4-butandeiol at 25° C. were added into a pint can. The mixture after one minute stirring was casted into ASTM plaque mold, preheated to 100° C. for 24 hours in an oven. The cured PU elastomers were conditioned for a minimum of one week at room temperature prior to testing.

Comparative Example 5

This example illustrates the use of a non-sorbitol branched polyester. Specifically this example employs tripentaerythritol is fabricating the polyester.

I. Preparation of Comparative Polyester G

| RAW MATERIAL | amount, (grams) |
| --- | --- |
| DEG (diethylene glycol) | 495.6 |
| TPE (tripentaerythritol) | 20.7 |
| AA (adipic Acid) | 642.1 |
| Total Load | 1,158.3 |
| Organotin catalyst | 0.02 |
| Water to distill | 158.3 |
| Theoretical Yield | 1,000.00 |
| Theoretical hydroxyl number | 56.1 |
| Temperature, C. | 230 |
| Calculated functionality | 3.0 |
| Acid number | 0.50max |

A four neck glass flask, equipped with a nitrogen inlet, a stirrer, a column, and a thermometer, was charged with the catalyst, diethylene glycol, TPE(tripentaerythritol), and adipic acid. The temperature was increased to 230° C. +/−2, while the column was kept hot using steam. The nitrogen and agiation were increased, as the reaction proceeded, to facilitate the water removal but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II A) Preparation of Polyurethane G-1

| Ingredients | weight, grams |
| --- | --- |
| Comparative Polyester G | 1,000.0 |
| MDI (4,4'-Diphenylmethane diisocyanate) | 415.5 |
| 1,4BD (1,4-Butanediol) | 99.6 |
| Isocyanate Index (I.I.) | 105 |
| Hard Segment %** | 34 |

II B) Preparation of Polyurethane G-2

| Ingredients | weight, grams |
| --- | --- |
| Comparative Polyester G | 1,000.0 |
| MDI (4,4'-Diphenylmethane diisocyanate) | 267.1 |
| 1,4BD (1,4BD (1,4-Butanediol | 48.7 |
| Isocyanate Index %** | 105 |
| Hard Segment %** | 24 |

Comparative Polyester G was vacuum-dehydrated to a moisture content of less than 0.03% prior to elastomer preparation. Comparative Polyester G at 80° C., MDI at 50° C., and 1,4-butanediol at 25° C. were added into a pint can.

The mixture after one minute stirring was casted into ASTM plaque mold, preheated to 100° C. for 1 hour in the mold, followed by post curing at 100° C. for 24 hours in an oven. Cured polyurethane elastomers were conditioned for a minimum of one week at room temperature prior to testing.

III. Preparation of Foam G-3

| TDI Foam | phr | Name | Suppliers |
|---|---|---|---|
| Comparative Polyester G | 100.00 | | Witco |
| Water (deionized) | 3.80 | | |
| Jeffcat NEM | 1.80 | N-Ethylmorpholine | Huntsman |
| Dabco B-16 | 0.10 | Dimethyl n-cetyl (C16) amine | Air Products |
| Fomrez B3550 | 1.00 | Organo-silicone surfactant | Witco |
| TDI 65/35 | 45.43 | Toluene diisocyanate 65/35 | Bayer |
| I.I | 100 | Isocyanate Index | |
| Total | 152.13 | | |

Free rise foams: The foams were prepared by free rise foaming using a bath mixer. The materials used were kept at room temperature prior to usage. A specified amount of polyol and surfactant were pre-weighed in a paper cup and the mixture stirred for about 30 seconds at 300 rpm. The catalyst(s) were added to the mixture and homogenized thouroughly, followed by the addition of water. The isocyanate was then added to the mixture and stirring was continued for another 10 seconds. The foam shrank and no physical properties were measured.

Inventive Example 1

This example illustrates the use of a sorbitol-branched polyester. Specifically, this example employs sorbitol in fabricating the polyester.

I. Preparation of Inventive Polyester C [ST-branched Poly (diethylene Adipate)Glycol]

| RAW MATERIAL | AMOUNT |
|---|---|
| DEG (diethylene glycol) | 496.8 g |
| ST (sorbitol) | 15.2 g |
| AA (adipic Acid) | 647.8 g |
| Total Load | 1,159.9 g |
| Organotin catalyst | 0.02 g |
| Water to distill | 159.9 g |
| Theoretical Yield | 1,000.0 g |
| Theoretical hydroxyl number | 56.1 |
| Temperature, ° C. | 230 |
| Calculated functionality | 3.0 |
| Acid number | 0.50 max |

A four neck glass flask, equipped with a nitrogen inlet, a stirrer, a column, and a thermometer, was charged with the catalyst, diethylene glycol, ST(sorbitol), and adipic acid. The temperature was increased to 230° C. +/−2, while the column was kept hot using steam. The nitrogen and agitation were increased, as the reaction proceeded, to facilitate the water removal, but not rapid enough to blow out the glycol. Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II A) Preparation of Inventive Polyurethane C-1 (MDI-based Elastomer)

| Ingredients | weight, grams |
|---|---|
| Inventive Polyester C* | 1,000.00 |
| MDI (4,4'-Diphenyldiisocyanate) | 415.5 |
| 1,4BD (1,4-Butanediol) | 99.6 |
| Isocyanate Index (I.I.) | 105 |
| Hard Segment %** | 34 |

*ST-branched poly(diethylene adipate)glycol, OH#56.1, functionality 3.0, M.W. 3,000
**(MDI + 1,4BD)/(MDI + 1,4BD + polyester) × 100%

II B Preparation of Inventive Polyurethane C-2

| Ingredients | weight, grams |
|---|---|
| Inventive Polyester C | 1,000.0 |
| MDI (4,4'-Diphenylmethane diisocyanate) | 267.1 |
| 1,4BD (1,4-Butandiol) | 48.7 |
| Isocyanate Index (I.I.) | 105 |
| Hard Segment %** | 24 |

*ST-branched poly (diethylene adipate) glycol, OH#56.1, functionality 3.0, M.W.3,000
**(MDI + 1,4BD)/(MDI + 1,4BD + polyester) × 100%

Inventive Polyester C (based on sorbitol) was vacuum-dehydrated to a moisture content of less than 0.03% prior to elastomer preparation. The mixture after one minute stirring was cast into an ASTM plaque mold preheated to 100° C., cured at 100° C. for 1 hour in the mold, followed by post curing at 100° C. for 24 hours in an oven. The cured PU elastomers were conditioned for a minimum of one week at room temperature prior to testing.

III. Preparation of Inventive Foam C-2 (TDI-based Foam)

| TDI Foam | phr | Name | Suppliers |
|---|---|---|---|
| Inventive Polyester C | 100.00 | | Witco |
| Water (deionized) | 3.80 | | |
| Jettcat NEM | 1.80 | N-Ethyl-morpholine | Huntsman |
| Dabco B-16 | 0.10 | Dimethyl n-cetyl (C16) amine | Air Products |
| Niax B350 | 1.00 | Organo-silicone surfactant | Witco |
| TDI 65/35 | 45.43 | Toluene diisocyanate 65/35 | Bayer |
| I.I. | 100 | Isocyanate Index | |
| Total | 152.13 | | |

Free rise foams: The foams were prepared by free rise foaming using a bench mixer. The materials used were kept at room temperature prior to usage. A specified amount of Inventive Polyester C and surfactant were pre-weighed in a paper cup and the mixture stirred for about 30 seconds at 300 rpm. The catalysts were added to the mixture and homogenized thoroughly, followed by the addition of water. The isocyanate was then added to the mixture and stirring was continued for another 10 seconds. The rate of foam formation was monitored by measuring cream time, rise time, gel time and tack free time.

Inventive Example 2

This example illustrates the use of a sorbitol-branched polyester specifically sorbitol having a hydroxyl group functionality of 6.0 and a hydroxyl number of 56. In this example, the sorbitol-branched polyester is blended with another polyol, (poly(diethylene adipate) glycol, to form a polyurethane of the invention.

I. Preparation of Inventive Polyester D

| RAW MATERIAL: | (weight, grams) |
| --- | --- |
| DEG (diethylene glycol) | 475.9 |
| ST (sorbitol) | 30.3 |
| AA (adipic Acid) | 655.4 |
| Total Load | 1,161.6 |
| Organotin catalyst | 0.02 |
| Water to Distill | 161.6 |
| Theoretical Yield | 1,000.0 |
| Theoretical hydroxyl number | 56.1 |
| Temperature, C. | 230 |
| Calculated functionality | 6.0 |
| Acid number | 0.50 max |

A four neck glass flask, equipped with a nitrogen inlet, a stirrer, a column, and a thermometer, was charged with the catalyst, diethylene glycol, ST (sorbitol), and adipic acid. The temperature was increased to 230° C. +/−2, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted with diethylene glycol to reach the theoretical hydroxyl value. The reaction was considered complete when the hydroxyl number and the acid number reached the expected values.

II. Preparation of Inventive Polyurethane E (Blend)

| Ingredients | weight, grams |
| --- | --- |
| Inventive polyester D* | 500.0 |
| Fomrez 11-56** | 500.0 |
| MDI (4,4'-Diphenylmethane diisocyyanate) | 267.1 |
| 1,4BD (1,4-Butandiol) | 48.7 |
| Isocyanate Index (I.I.) | 105 |
| Hard segment %*** | 24 |

*ST-branched poly(diethylene adipate)glycol; OH#56.1; Functionality 6.0; MW 6,000.
**poly(diethylene adipate)glycol; OH#56.1; functionality 2.0; MW 2,000 (Witco)
***(MDI + 1,4BD)/(MDI + 1, 4BD + polyester) × 100%
Inventive Polyester D and Fomrez 11-56 (with a blend functionality of 3.0) was vacuum-dehydrated to a moisture content of less than 0.03% prior to elastomer preperation.

The polyol at 80° C., MDI at 50° C., and 1,4-butandiol at 25° C. were added into a pint can. The mixture after one minute stirring was casted into ASTM plaque mold, preheated to 100° C. for 24 hours in an oven. The cured PU elastomers were conditioned for a minimum of one week at room temperature prior to testing.

TABLE 1

Physical properties of MDI-based elastomers

| Example: | Comp.Ex. 1 | Comp.Ex. 2 | Inv. Ex.3 | Comp.Ex. 5 |
| --- | --- | --- | --- | --- |
| MDI elastomers | A-1 | B-1 | C-1 | G-1 |
| Branched glycol of polyester | TMP | Gly | ST | TPE |
| Hard Segment % | 34 | 34 | 34 | 34 |
| Ross Flex, 500%, −40° C., cycles | 1 | 100 | 1500 | 35 |
| Ross flex, failure, −40° C., cycles | 185 | 1000 | 6500 | 440 |
| Tensile strength, psi | 1375 | 1793 | 3185 | 1006 |
| Modulus 100%, psi | 871 | 926 | 1005 | 726 |
| Modulus 200%, psi | N/A | 1257 | 1529 | N/A |
| Modulus 300%, psi | N/A | N/A | 1634 | N/A |
| Elongation % | 190 | 230 | 469 | 144 |
| Tear, Die C, pli | 219 | 237 | 352 | 139 |
| Tear, split, pli | 20 | 20 | 48 | 20 |
| Tabor abrasion, 1000 cycles, mg | 60 | 14 | 12 | 32 |
| Tabor abrasion, 5000 cycles, mg | 317 | 85 | 70 | 75 |
| Bashore rebound, % | 28 | 36 | 40 | 29 |
| EtOAc uptake, wt % | 49 | 45 | 41 | 52 |
| EtOH uptake, wt % | 13 | 13 | 11 | 13 |
| IPA uptake, wt % | 5 | 5 | 5 | 6 |
| MEK uptake, wt % | 53 | 56 | 41 | 57 |
| Toluene uptake, wt % | 28 | 27 | 25 | 27 |
| ASTM oil#1 uptake, wt % | 0.19 | 0.20 | 0.16 | 0.28 |
| ASTM oil#2 uptake, wt % | 0.22 | 0.24 | 0.17 | 0.22 |
| Water uptake, wt % | 1.68 | 1.68 | 1.66 | 1.75 |
| Over all properties | | | the best | |

TABLE 2

Physical properties of MDI-based elastomers (Hard segment % of 24)

|  | Comp. Ex.1 | Com pEx.2 | Comp. Ex.3 | Inv. Ex. 1 | Inv. Ex. 2 | Comp Ex. 4 | Comp. Ex. 5 |
|---|---|---|---|---|---|---|---|
| MDI Elastomers | IIB | IIB | II | IIB | II | II | IIB |
| Branched glycol of polyester | TMP | Gly | PE | ST | ST + 11 | DPE | TPE |
| Hard segment % | 24 | 24 | 24 | 24 | 24 | 24 | 24 |
| Tensile strength, psi | 580 | 650 | 550 | 1820 | 1100 | 280 | 370 |
| Modulus 200%, psi | — | — | — | 410 | 350 | — | — |
| Modulus 300%, psi | — | — | — | 590 | 470 | — | — |
| Elongation % | 150 | 180 | 120 | 570 | 540 | 63 | 92 |
| Tear, Die C,pli | 66 | 78 | 79 | 160 | 170 | 47 | 79 |
| Elasticity recovery % | — | — | — | 83 | 75 | — | — |
| Over all properties |  |  |  | the best | the best |  |  |

Physical properties of TDI-based foams (hard segment 28%)

| Example: | Comp. Ex.1 | Comp. Ex. 2 | Inv. Ex.3 |
|---|---|---|---|
| TDI foams | Comp. Foam A-2 | Comp. Foam B-2 | Inventive Foam C-2 |
| Branched glycol of polyester | TMP | Gly | ST |
| Hard segment | 28 | 28 | 28 |
| Tensile strength, psi | 14 | 13 | 22 |
| Modulus 100%, psi | 11 | 12 | 13 |
| Elongation % | 120 | 110 | 230 |
| Tear, Die C, pli | 7 | 7 | 9 |
| Tear, split, pli | 3 | 3 | 4 |
| Overall properties |  |  | thebest |

The polyurethane products prepared in accordance with this invention using sorbitol-branched polyesters exhibited unexpectedly superior physical properties compared to polyurethanes prepared from conventional, non-sorbitol-branched polyesters, even when compared on an equivalent basis as to the overall functionality of the polyester used in making the polyurethane. Properties as to which the products of this invention exhibit superiority include low temperature flexibility, high tensile strength, high tear strength, high modulus strength, elongation, abrasion resistance, rebound and solvent resistance.

While this invention has been particularly shown and described with respect to preferred embodiments thereof, it will be understood by those skilled in the art that the foregoing and other changes in form and detail may be made without departing from the spirit and scope of the present invention. It is therefore intended that the present invention not be limited to the exact forms described and illustrated, but fall within the scope of the appended claims.

What is claimed is:

1. Polyurethane obtained by reacting a sorbitol-branched polyester with a polyisocyanate and optionally a chain extender or foaming agent, wherein the sorbitol-branched polyester comprises the reaction product of esterifying a diacid (or anhydride thereof) containing 2 to 12 carbon atoms with a diol containing 2 to 12 carbon atoms and sorbitol, said sorbitol present in an amount sufficient to comprise about 0.1 wt. % to about 15 wt. % of the sorbitol-branched polyester.

2. Polyurethane according to claim 1 wherein the reaction product includes at least one polyol reactant, said polyol reactant, different from said diol, containing 2 or more hydroxyl groups and up to 50 carbon atoms.

3. Polyurethane according to claim 2 wherein said polyol reactant comprises one or more of glucose, dipentaerythritol, sucrose, tripentaerythritol, allitol, cyclodextrin (cycloheptamylose), dulcitol (galactitol), glucitol, mannitol, altritol, iditol, ribitol, arabinitol, xylitol, maltitol, lactitol, trimethylolpropane, glycerin, trimethylolethane, tris-(2-hydroxyethyl)isocyanurate, tris-(2-hydroxypropyl) isocyanurate, tris-(3-hydroxypropyl)isocyanurate triisopropanolamine or pentaerythritol.

4. Polyurethane according to claim 2 wherein said polyol reactant is alkoxylated with up to 30 moles, per mole of said polyol reactant, of alkylene oxide.

5. Polyurethane according to claim 4 wherein said alkylene oxide is selected from the group consisting of ethylene oxide, propylene oxide, butylene oxide and mixtures thereof.

6. Polyurethane according to claim 1 wherein said sorbitol is present in an amount sufficient to comprise from about 0.5 wt % to about 15 wt % of the sorbitol-branched polyester.

7. Polyurethane according to claim 6 wherein said sorbitol is present in an amount sufficient to comprise about 1 wt % to about 15 wt % of the sorbitol-branched polyester.

8. Polyurethane according to claim 7 wherein said sorbitol is present in an amount sufficient to comprise about 5 wt % to about 15 wt % of the sorbitol-branched polyester.

9. Polyurethane according to claim 1 wherein said diol is selected from the group consisting of ethylene glycol, diethylene glycol, 1,3-propylene glycol, 1,2-propylene glycol, diethylene glycol, 1,3-propylene glycol, 2,2-dimethyl-1,3-propanediol, 2-ethyl-2-butyl-1,3-propanediol, 2-ethyl-2-isobutyl-1,3-propanediol, 1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

10. Polyurethane according to claim 9 wherein said diol is selected from the group consisting of 1,4-butanediol, 1,6-hexanediol, ethylene glycol and diethylene glycol, 1,2-propylene glycol, neopentyl glycol, 2-methylpropanediol, 1,3-propanediol, 3-methylpentanediol, 1,5-pentanediol and 1,9-nonanediol.

11. Polyurethane according to claim 1 wherein said diacid is selected from the group consisting of oxalic, malonic, dimethylmalonic, succinic, glutaric, adipic, trimethyladipic, pimelic, pivalic, dodocanedioic, 2,2-dimethylglutaric, azelaic, sebacic, maleic, fumaric, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,6-norbornanedicarboxylic, 1,4-naphthalic, diphenic, 4,4'-oxydibenzoic, diglycolic, thiodipropionic, 4,4-sulfonyldibenzoic, 2,6-naphthalenedicarboxylic acids and anhydrides thereof.

12. Polyurethane according to claim 11 wherein said diacid is selected from the group consisting of isophthalic acid, terephthalic acid, phthalic acid, adipic acid, tetrahydrophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and anhydrides thereof.

13. Polyurethane according to claim 12 wherein said diacid is adipic acid.

14. Polyurethane according to claim 1 wherein said polyisocyanate is selected from the group consisting of isophorone diisocyanate, tetramethylene-diisocyanate, hexamethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanabodicyclohexylmethane, 4,4'-diisocyanato-dicyclohexyl-propane-(2,2); 1,4-diisocyanato-benzene, toluene diisocyanate, 4,4'-diphenylmethane diisocyanate, 4,4'-diisocyanatodiphenyl-propane-(2,2), p-xylylene-diisocyanate, a,a,a',a'-tetramethyl-m or p-xylylene-diisocyanate and mixtures thereof.

15. Polyurethane according to claim 14 wherein said polyisocyanate is toluene diisocyanate, 4,4'-diisocyanatodphenylmethane or isophorone diisocyanate.

16. Polyurethane according to claim 1 wherein said optional chain extender is water, polyamine, polyol, an alkyl or aromatic polyol, or an alkyl or aromatic polyamine, wherein the alkyl moiety contains a total of 2 to 12 carbon atoms and the aromatic moiety contains 6 to 10 carbon atoms.

17. Polyurethane according to claim 16 wherein said optional chain extender is water, hydrazine, ethylene diamine, diethylene triamine, 1,2-diaminopropane, 1,3-diaminopropane, 1,4-diaminobutane, or 3,3,5-trimethyl-5-aminomethyl cyclohexyldiamine or 1,4-butanediol, ethylene glycol, diethylene glycol, 1,2-propylene glycol, 1,6-hexanediol, 1,3-propanediol, 2-methylpropanediol, 3-methylpentanediol, glycerine or trimethylolpropane.

18. Polyurethane according to claim 1 wherein said diacid comprises adipic acid or an anhydride thereof, said diol comprises ethylene glycol, diethylene glycol, 1,4-butanediol, or 1,6-hexanediol, and said polyisocyanate comprises isophorone diisocyanate, toluene diisocyanate, or 4,4'-diphenylmethane diisocyanate.

19. A method of producing polyurethane, comprising reacting a sorbitol-branched polyester with polyisocyanate and optionally a chain extender or foaming agent, wherein the sorbitol-branched polyester comprises the reaction product of esterifying a diacid (or anhydride thereof) containing 2 to 12 carbon atoms with a diol containing 2 to 12 carbon atoms and sorbitol provided that said sorbitol is present in an amount sufficient to comprise about 0.1 wt. % to about 15 wt. % of the sorbitol-branched polyester.

20. The method according to claim 19 wherein the reaction product includes at least one polyol reactant, said polyol reactant, different from said diol, containing 2 or more hydroxyl to 50 carbon atoms.

21. The method according to claim 20 wherein said polyol reactant comprises one or more of glucose, dipentaerythritol, sucrose, tripentaerythritol, allitol, cyclodextrin (cycloheptamylose), dulcitol (galactitol), glucitol, mannitol, altritol, iditol, ribitol, arabinitol, xylitol, maltitol, lactitol, trimethylolpropane, glycerin, trimethylolethane, tris-(2-hydroxyethyl)isocyanurate, tris-(2-hydroxypropyl) isocyanurate, tris-(3-hydroxypropyl)isocyanurate triisopropanolamine or pentaerythritol.

22. The method according to claim 20 wherein said polyol reactant is alkoxylated with up to 30 moles, per mole of said polyol reactant, of alkylene oxide.

23. Polyurethane according to claim 22 wherein said alkylene oxide is selected from the group consisting of ethylene oxide, propylene oxide, and mixtures thereof.

24. The method according to claim 19 wherein said sorbitol is present in an amount sufficient to comprise from about 0.5 wt. % to about 15 wt. % of the sorbitol-branched polyester.

25. The method according to claim 24 wherein said sorbitol is present in an amount sufficient to comprise about 1 wt % to about 15 wt % of the sorbitol-branched polyester.

26. The method according to claim 25 wherein said sorbitol is present in an amount sufficient to comprise about 5 wt % to about 15 wt % of the sorbitol-branched polyester.

27. The method according to claim 19 wherein said polyisocyanate is selected from the group consisting of isophorone diisocyanate, tetramethylene-diisocyanate, hexamethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanatodicyclohexylmethane, 4,4'-diisocyanato-dicyclohexyl-propane-(2,2); 1,4-diisocyanato-benzene, toluene diisocyanate, 4,4'-diphenylmethane diisocyanate, 4,4'-diisocyanatodiphenyl-propane-(2,2), p-xylylene-diisocyanate, a,a,a',a'-tetramethyl-m or p-xylylene-diisocyanate and mixtures thereof.

28. The method according to claim 27 wherein said polyisocyanate is toluene diisocyanate, 4,4'-diisocyanatodiphenylmethane, or isophorone diisocyanate.

29. The method according to claim 28 wherein said optional chain extender is water polyamine, polyol, an alkyl or aromatic polyol, or an alkyl or aromatic polyamine, wherein the alkyl moiety contains a total of 2 to 12 carbon atoms or the aromatic moiety contains 6 to 10 carbon atoms.

30. A method according to claim 29 wherein said optional chain extender is water hydrazine, ethylene diamine, diethylene triamine, 1,2-diaminopropane, 1,3-diaminopropane, 1,4-diaminobutane, or 3,3,5-trimethyl- 5-aminomethyl cyclohexyldiamine or ethylene glycols.

31. The method according to claim 19 wherein said diacid comprises adipic acid or an anhydride thereof, said diol comprises ethylene glycol, diethylene glycol, 1,4-butanediol, 1,6-hexanediol, 1,2-propylene glycol, neopentyl glycol, 2-methylpropanediol, 1,3-propanediol, 5-methylpentanediol, 1,5-pentanediol or 1,9-nonanediol, said one or more polyhydroxy compounds comprise sorbitol, and said polyisocyanate is isophorone diisocyanate, toluene diisocyanate, or 4,4'-diphenylmethane diisocyanate, 4,4'-diisocyanatodiphenyl-propane-(2,2), p-xylylene-diisocyanate, a,a,a'a'-tetramethyl-m or p-xylylene-diisocyanate and mixtures thereof.

32. The method according to claim 31 wherein said polyisocyanate is toluene diisocyanate, 4,4'-diisocyanatodiphenylmethane, or isophorone diisocyanate.

33. The method according to claim 32 wherein said optional chain extender is water, polyamine, polyol, an alkyl or aromatic polyol, or an alkyl or aromatic polyamine, wherein the alkyl moiety contains a total of 2 to 12 carbon atoms or the aromatic moiety contains 6 to 10 carbon atoms.

34. A method according to claim 33 wherein said optional chain extender water, hydrazine, ethylene diamine, diethylene triamine, 1,2-diaminopropane, 1,3-diaminopropane, 1,4-diaminobutane, 3,3,5-trimethyl- 5-aminomethyl cyclohexyldiamine or ethylene glycol.

35. The method according to claim 19 wherein said diacid comprises adipic acid or an anhydride thereof, said diol comprises ethylene glycol, diethylene glycol, 1,4-butanediol, or 1,6-hexanediol, 1,2-propylene glycol, neopentyl glycol, 2-methylpropanediol, 1,3-propanediol, 5-methylpentanediol, 1,5-pentanediol or 9-nonanediol, and said polyisocyanate comprises isophorone diisocyanate, toluene diisocyanate, or 4,4'-diphenylmethane diisocyanate.

* * * * *